United States Patent [19]
Graham, Jr.

[11] 3,970,045
[45] July 20, 1976

[54] PORTABLE ANIMAL PEN AND GATE STRUCTURE

[76] Inventor: Joseph A. Graham, Jr., Milo, Iowa 50166

[22] Filed: May 7, 1975

[21] Appl. No.: 575,430

[52] U.S. Cl. .................................. 119/20; 119/155
[51] Int. Cl.² .......................................... A01K 29/00
[58] Field of Search ...................... 119/20, 82, 155

[56] References Cited
UNITED STATES PATENTS

| | | | |
|---|---|---|---|
| 2,863,696 | 12/1958 | Sigman | 119/82 X |
| 3,204,606 | 9/1965 | Parr et al. | 119/20 |
| 3,545,407 | 12/1970 | Moore | 119/20 |

*Primary Examiner*—Hugh R. Chamblee
*Attorney, Agent, or Firm*—Morton S. Adler

[57] ABSTRACT

A portable knockdown animal pen structure includes three like dimensioned fence or barrier sections that are interlockably connectible to each other to form a free standing three sided enclosure arrangeable intermediate a corral or barn where cattle are contained and a holding chute where the cattle are directed for such matters as vaccinations, blood and pregnancy tests, branding and the like. At least two sections are provided with a gate of which one is used relative to the gate in the corral or barn and the other is movable and releasably lockable to the third section to form two pens or enclosures. In one pen having access to the corral or barn, an animal therefrom is temporarily contained and is denied access to the other pen which has access to the chute and in which an operator is protected from such animal while administering to another animal in the chute. The lockable gate is openable between the pens after the animal in the chute is released and the operator is provided an egress to the outside of the barrier sections while the animal in the holding pen moves through the second pen into the chute.

8 Claims, 9 Drawing Figures

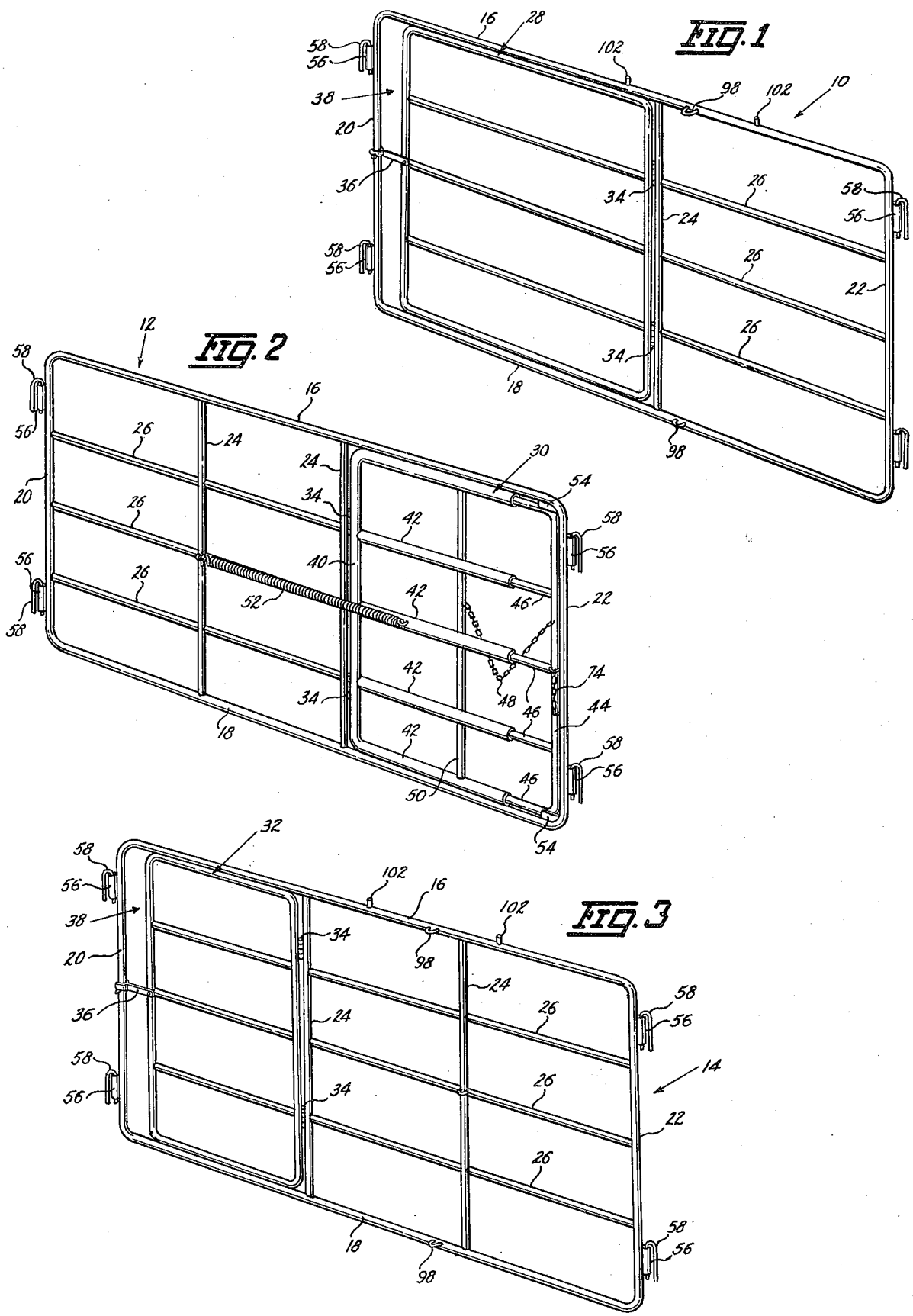

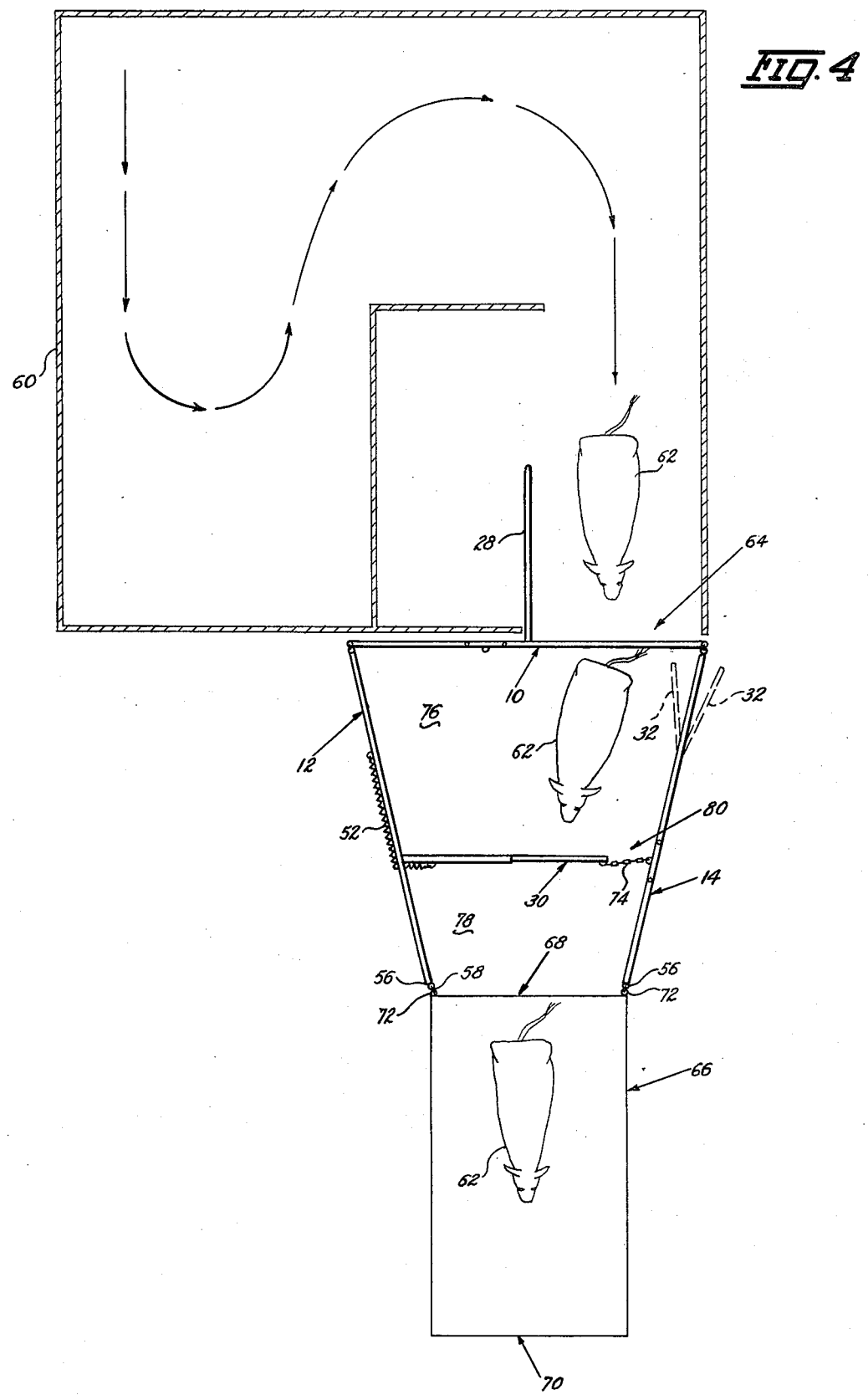

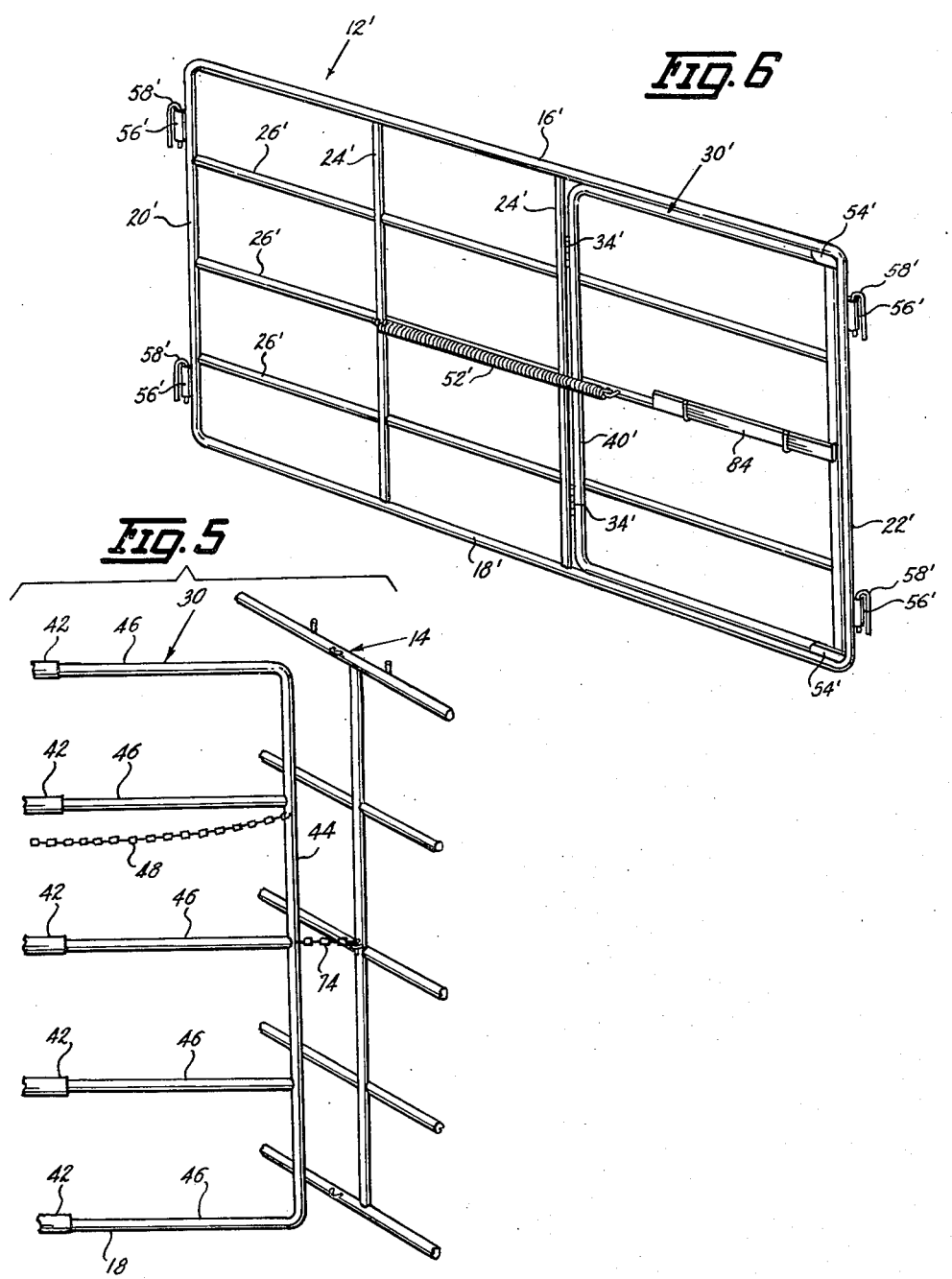

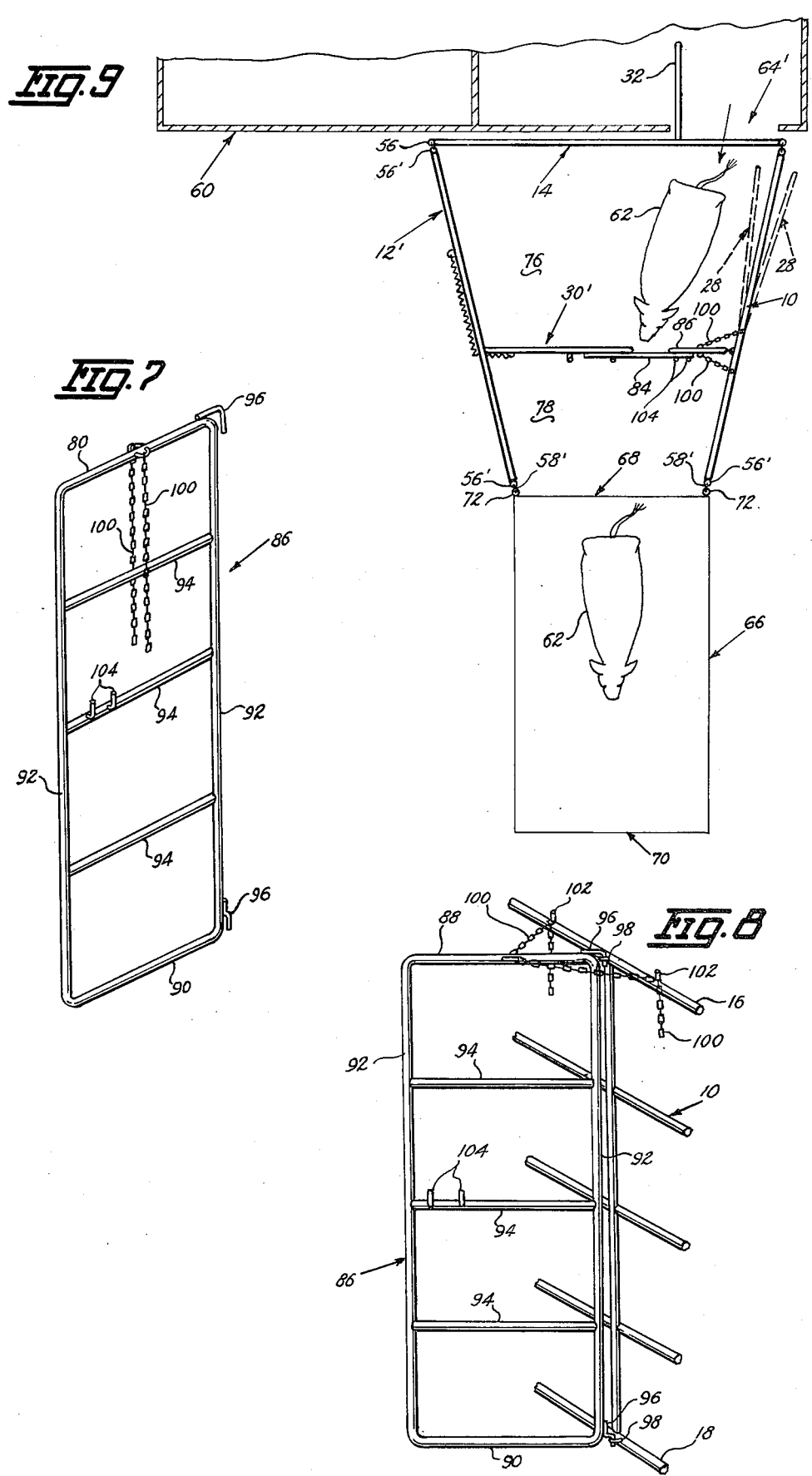

PORTABLE ANIMAL PEN AND GATE STRUCTURE

BACKGROUND OF THE INVENTION

This invention relates to improvements in portable animal pens to facilitate the movement of animals from an enclosure such as a corral or barn into a holding chute.

In raising animals such as cattle, for example, it is necessary from time to time that they be handled for such matters as vaccination, blood and pregnancy tests, test, branding and the like and for such purposes, they are commonly assembled in a corral or barn from which they are moved singly into what is known as a holding and/or catch chute. Such chutes are designed with various means for restraining the animal for obvious reasons and are generally provided by a veterinarian or the cattle owner. No invention is claimed here for such chutes per se and one type is illustrated in U.S. Pat. No. 2,266,991.

Once cattle have been in the chute, they are often reluctant to readily enter it again and thus when such chutes are deployed immediately adjacent the gate to a corral or barn, considerable difficulty and effort is usually required to move them into the chute and not infrequently, personnel involved are subjected to injury. Certain endeavors to alleviate these problems appear in U.S. Pat. Nos. 2,691,359, 2,835,223 and 3,002,493 where different arrangements of movable and portable barrier sections are disclosed and the present invention, resulting from many years of experiments and observations relative to the type of animal handling problems indicated, provides several improvements in portable pen structures.

It is thus one of the important objects of this invention to provide a sectionalized portable and knockdown animal pen structure wherein a plurality of barrier or fence sections are interlockably connectible to each other to form a relatively stable free standing enclosure or pen which does not require attachment to ground embedded support members.

Another object is to provide an animal pen structure of the above class designed for use intermediate a corral or barn and a holding chute to form a passageway therebetween and which includes gate means in the fence sections movable to establish two enclosures or pens within the sectional structure of which one is a holding pen to temporarily contain one animal from the corral or barn and the other provides a protected area for an operator administering to another animal already in the chute.

A further object herein is to provide a pen structure as characterized which utilizes three like dimensioned fence sections arranged at one point to communicate with the gate of a corral or barn and to provide converging sections communicating with the entrance to the chute.

Still another object is to provide a pen structure as indicated above wherein the size of the intermediate holding pen is sufficient to permit the contained animal a limited freedom of movement sufficient to eliminate the effect of its being hemmed in and to thus avoid the natural tendency of an animal in unduly confined quarters to seek an immediate exit.

Another object is to provide a pen structure as outlined that is conveniently portable, simple and easy to erect and dismantle and sufficiently sturdy for efficiently performing its intended purpose.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIGS. 1, 2 and 3 are respective perspective views of the three fence sections each having a separate gate which are utilized for the present invention, FIG. 4 is a schematic view showing the fence sections of FIGS. 1, 2 and 3 assembled for use relative to a corral or barn and a holding chute and with the gate in one section cooperating with another section to form two enclosures or pens intermediate the corral or barn and the chute, FIG. 5 is an enlarged fragmentary perspective view of the gate shown in FIG. 4 to more clearly illustrate its arrangement for establishing two enclosures or pens, FIG. 6 is perspective view of a second embodiment of the fence section shown in FIG. 2, FIG. 7 is a perspective view of a partition for use with the fence section shown in FIG. 6, FIG. 8 is a perspective view of the partition in FIG. 7 shown in mounted position relative to a fence section other than the section shown in FIG. 6, and FIG. 9 is a schematic view similar to FIG. 4 but showing the use of the fence section of FIG. 6 and partition in FIGS. 7 and 8 in forming two enclosures or pens and also showing a corral or barn having a gate opening smaller than the comparable opening in FIG. 4.

DESCRIPTION OF THE PREFERRED EMBODIMENTS

Referring to the drawings, this invention utilizes three like sized rectangular fence sections designated generally by the numerals 10, 12 and 14 as seen respectively in FIGS. 1, 2 and 3 and while any suitable material may be used for such sections, I have preferably used metal pipe wherein like parts, where applicable, will be given like numbers. Also, for reasons as will appear, I preferably make all sections 10, 12 and 14 5 feet high and 10 feet long. Each section 10, 12 and 14 includes spaced top 16 and bottom 18 horizontal rails connected at respective ends by vertical posts 20 and 22 to form a section frame. One or more vertical posts 24 are provided within the confines of each fence section frame together with a plurality of spaced horizontal rails 26 for the purpose of making such sections a suitable barrier means for use as an animal enclosure as will appear.

As best seen in FIGS. 1, 2 and 3, however, the posts 24 and rails 26 occupy only a portion of the area defined by the fence section frame and the remaining portion is occupied by a respective barrier gate of any suitable construction designated 28 for section 10, 30 for section 12 and 32 for section 14. Each gate is pivotally attached by any suitable hinge means 34 to a vertical post 24 so as to be capable of swinging in either direction as shown for gate 32 in FIG. 4 and for gate 28 in FIG. 9. The gate 28 in section 10 (FIG. 1) and the gate 32 in section 14 (FIG. 3) differ only in size with gate 28 being the larger and in actual measurement being five feet wide with gate 32 being three feet wide for purposes to be later explained. Each gate 28 and 32, and also 30, is latchable 36 with a post 20 and gates 28 and 32 terminate at one side in a spaced relationship to the latch post 20 on the order of approximately six inches as indicated by the numeral 38 as will be further explained.

Gate 30 (FIG. 2), normally four feet wide when latched within frame section 12, is designed to be extensible when opened relative to section 12 and for this purpose, includes the vertical post 40 secured to hinge 34. From post 40 there extends a plurality of spaced horizontal stub pipes 42 towards post 22. A second gate post 44 has horizontal pipes or rods 46 smaller in diameter than pipes 42 and disposed for respective telescopic registration therewith. The extension of gate 30 is limited by a chain stop 48 secured at respective opposite ends to post 44 and an intermediate vertical gate post 550. Gate 30 is normally urged to closed position within the section frame 12 by a spring 52 secured at respective ends to a post 24 and a gate pipe 42 and such gate abuts stops 54 as shown. The vertical posts 20 and 22 on each section 10, 12 and 14 are provided with suitable fastening means for which I have preferably used a pair of vertically spaced pipes 56 for reception of a sturdy U pin 58 and thus far described, sections 10, 12 and 14 are used as follows with reference being made particularly FIG. 4.

For illustration, a corral or barn is designated generally by the numeral 60 where animals 62 can be assembled for movement singly through a corral gate opening 64 into a holding chute illustrated schematically at 66. As indicated above, chute 66 is a commonly known restraining device having an entrance end 68 and an exit end 70 for which different types are available to hold an animal 62 during the administering of such treatments as vaccinations, pregnancy tests and the like and due to difficulties in getting the animals into such a chute as previously discussed, the present invention is designed to provide a pen structure intermediate the corral 60 and chute 66 which has several advantages in the handling of the animals 62 in the environment set forth as will appear.

Fence sections 10, 12 and 14, which are easily portable with knockdown capabilities and conveniently transportable, are assembled into a three sides arrangement by interlocking one end of section 12 to one end of section 10 and similarly arranging one end of section 14 with the other end of section 12. This is done by abutting respective pipes 56 and securing them with an U pin 58. In this arrangement, section 10 is placed closely adjacent the corral 60 so that gate 28 registers with the corral gate opening 64. The other ends of section 12 and 14 are removably attached to opposite sides of the entrance 68 to chute 66 which may be done in any suitable and convenient manner as by the use of cord or wire or, as shown, by attaching stub pipes 72 to the chute which are similar to pipes 56 for use of a U pin 58. In this assembly of sections 10, 12 and 14, a relative sturdy enclosure is formed of a trapezoid configuration which is free standing and requires no anchoring to ground embedded supports or posts and thus may be set up even on a concrete slab, if necessary, on which the lower section rails 18 merely rest.

Gate 30 in fence section 12 is swingable inwardly relative to the formed enclosure towards fence section 14 and can be extended to be removably latched to section 14 by a chain 74 or the like to form the two pens or enclosures 76 and 78 of which 76 will be referred to as a temporary animal holding pen. It is not necessary that gate 30 extend all the way to section 14 and it is sufficient if any space existing such as at 80 is narrow enough to prevent an animal 62 passing therethrough.

With sections 10, 12 and 14 arranged as described, gate 28 in section 10 is openable into the corral 60 through the corral gate 64 so as to make the entire area of pen 76 available for an animal 62 which enters the same as shown. Here, one of the advantages of my pen structure intermediate corral 60 and chute 66 as compared with placing chute 66 adjacent corral gate opening 64 is that the ten foot long section members 10, 12 and 14 arranged as indicated provide an ample size for pen 76 so that such pen does not have the appearance of an unduly confined area and since ample area is thus available for the animal to turn and move about, it has been successfully demonstrated in many field tests that animals 62 will move from the corral 60 into pen 76 with no difficulty or balking. This is an important factor since in more confined quarters with little or no room to move about, it is a natural tendency of animals to become unruly in endeavoring to seek a quick exit.

With an animal 62 once in pen 76, gate 28 is closed and with the return of gate 30 towards section 12, an exit from pen 76 to pen or enclosure 78 is created whereby it has been found that the animal freely enters pen 78 and on into chute 66 where where it is secured and restrained in a well known manner for administering to by an operator (not shown) as previously pointed out.

Gate 30 is returned to latched relationship with section 14 once an animal is in chute 66 and thus pen or enclosure 78 becomes a protected and safe area in which an operator can work on the restrained animal. During this time, gate 28 is opened and another animal can enter the holding pen 76 where it does not have access to the operator in pen 78. When the animal in chute 66 is released through exit 70, the operator in pen 78 can open gate 30 to pen 76 and by stepping through section 12 and closing gate 30 therein, pen 78 is clear for the animal to move into and through so that at no time is the operator in danger of injury from any animals not yet in chute 66.

With reference now to FIG. 6, there is shown a second embodiment of fence section 12 (FIG. 2) where like numerals primed will be given to corresponding parts so that the section shown in FIG. 6 is designated 12'. Such section 12' differs only from section 12 in the construction of gate 3' wherein gate 3' is a unitary structure similar to gates 28 and 32 and not extensible as gate 30. However, gate 3' functions for the same purpose as gate 30 for which it is provided with a laterally slidable lock bar 84. For use with gate 30', I provide a rectangular barrier partition 86 (FIG. 7) having top 88, bottom 90 and side rails 92 with intermediate brace cross bars 94 as shown. on one of the side rails 92 is placed a pair of spaced hooks 96 for pivotable arrangement in respective eyes or loops 98 which are placed on rails 16 and 18 of sections 10 and 14 (FIGS. 1 and 3) so that partition 86 can be positioned prependicularly to whichever of section 10 or 14 it is attached as will be further explained. Chains 100 are provided as shown in FIG. 8 connected between rail 88 and spaced lugs 102 on section rail 16. With partition 86 thus positioned and restrained and with gate 30' moved inwardly relative to section 12' in the manner described for gate 30, lock bar 84 is slidable for engagement with a pair of keepers 104 on partition 86 to form the pens 76 and 78 as seen in FIG. 9.

It will be noted that FIG. 9 is similar to FIG. 4 in showing the general relationship of this new pen structure to the corral or barn 60 and the chute 66 and FIG. 9 is provided to illustrate certain features of this invention as follows. The gate 64 in FIG. 4 is relatively wider than the corresponding gate 64' in FIG. 9 and such variations are not uncommon. Accordingly, with gate 32 in section 14 being smaller than gate 28 in section 10, section 10 is positioned adjacent the corral or barn 60 when the larger gate opening 64 is encountered and section 14 is used in such position when a smaller corral gate 64' is involved. In this way, the relative position of sections 10 and 14 are interchangeable relative to the corral gate and thus each such section 10 and 14 is adapted to carry partition 86 when they are in the appropriate position therefor.

While it is not generally intended that gates 28 and 32 will be swung into pen 76, there may be times when this is or will be done and because of the angular relationship between the sections when assembled, the spacing 38 (FIGS. 1 and 3) is provided so that such gates can be swung freely into pen 76, if needed, without the adjoining fence section impeding their path of movement.

The foregoing pen structure is easily and quickly assembled and disassembled and has proved to be highly efficient in the orderly movement of animals from the corral 60 to chute 66 and in providing a safe and protected working area for an operator. Accordingly, in view of the foregoing, it is though a full understanding of the contruction and operation of this invention will be had and the advantages of the same will be appreciated.

I claim:

1. A knockdown portable animal pen structure for use intermediate an animal enclosure such as a corral or barn and a holding chute in which an animal is restrained to be administered various treatments, said pen structure comprising:
    first, second and third rectangular fence sections defining suitable barrier members with respective top, bottom and opposed ends,
    fastening means carried by the respective ends of said respective sections for removable interlocking hinged engagement with each other,
    a respective latchable gate within the confines of said first and second fence sections,
    the respective ends of said second fence section being hingedly engaged to a respective end of said first and third fence sections so that said second fence section is disposed immediately adjacent an animal enclosure such as a corral or barn and intermediate said corral or barn and an animal holding chute with the gate in said second fence section being openable for communication with a gate opening in the corral or barn,
    said first and third fence sections being positioned relative to respective opposite ends of said second fence section in a converging relationship towards the holding chute and with said fastening means on said other ends of said first and third fence sections being removably attached to respective opposite sides of the entrance to the holding chute, and
    the gate in said first fence section being movable towards and operably latchable to said third fence section to establish first and second pens or enclosures intermediate and in direct line beween the corral or barn and said holding chute wherein said first enclosure is accessible only to the corral or barn and said second enclosure is accessible only to the holding chute but with access between the enclosures available by movement of said gate away from said third fence section towards said first fence section.

2. An animal pen structure as defined in claim 1 including a latchable gate in said third fence section having an overall size different from that of the gate in said second fence section whereby the relative assembled positions of said second and third fence sections are interchangeable according to variations in size of the gate opening in the corral or barn.

3. An animal pen structure as defined in claim 1 including:
    the gate in said first fence section being of a generally square outline when latched within the frame of said first fence section,
    means for extending said gate to a rectangular shape when it is moved towards said third fence section, and
    latch means on the extended end of said gate for operable attachment to said third fence section.

4. An animal pen structure as defined in claim 3 wherein the gate in said first fence section comprises:
    a pair of vertical posts to each of which there is secured a plurality of spaced and correspondingly arranged horizontal rails,
    the rails on one of said posts being hollow,
    the rails on the other post being respectively telescopically journalled in corresponding hollow rails, and
    means on said first fence section connected to said gate to limit the distance of extension thereof.

5. An animal pen structure as defined in claim 1 including:
    a vertical partition pivotally attached to said third fence section and movable toward and away from said first fence section,
    means on said third fence section connected to said partition to selectively hold it in position extended toward said first fence section, and
    a slidable lock bar on the gate of said first fence section operable for latching engagement with said partition when said gate is moved towards said third fence section.

6. An animal pen structure as defined in claim 1 including said assembled fence sections being free standing by reason of said interlocking of said fastening means and with the bottom of each fence section merely resting on a ground supporting surface.

7. An animal pen structure as defined in claim 1 including all of said fence sections being of the same dimensions as to height and length.

8. An animal pen structure as defined in claim 7 including said fence sections each being approximately 5 feet high and approximately 10 feet long.

* * * * *